United States Patent [19]

Oyler et al.

[11] Patent Number: 4,683,029
[45] Date of Patent: Jul. 28, 1987

[54] CIRCULAR SOLVENT EXTRACTOR

[75] Inventors: John F. Oyler, Pittsburgh; Jerry D. Brand, Aliquippa; Richard Zavada, Pittsburgh, all of Pa.

[73] Assignee: Dravo Corporation, Pittsburgh, Pa.

[21] Appl. No.: 778,545

[22] Filed: Sep. 20, 1985

[51] Int. Cl.$^4$ ............................................. B01D 11/02
[52] U.S. Cl. .................. 196/14.52; 198/706; 422/268
[58] Field of Search ............. 196/14.52; 127/6, 5; 422/268, 269, 270, 278, 275; 208/390, 428, 432; 198/706, 708; 134/70, 78, 82, 125, 134, 158

[56] References Cited

U.S. PATENT DOCUMENTS

| | | | |
|---|---|---|---|
| 2,840,459 | 6/1958 | Karnofsky | 422/268 |
| 3,159,457 | 12/1964 | Zies | 422/268 |
| 3,302,936 | 2/1967 | Ban | 422/198 |
| 3,346,343 | 10/1967 | Wahler | 127/5 |
| 3,533,837 | 10/1970 | Strich | 127/6 |
| 3,860,395 | 1/1975 | Kehse et al. | 422/278 |
| 4,125,379 | 11/1978 | Saxon | 422/269 |
| 4,422,901 | 12/1983 | Karnofsky | 196/14.52 |
| 4,448,667 | 5/1984 | Karnofsky | 208/426 |

Primary Examiner—David L. Lacey
Assistant Examiner—Joye L. Woodard
Attorney, Agent, or Firm—Parmelee, Miller, Welsh & Kratz

[57] ABSTRACT

A circular solvent extractor useful in a commercial process for the removal of bitumen from tar or oil sands or other solvent extraction processes requiring high tonnage throughput. The extractor comprises two major segments that are stationary, namely, a ring-shaped roof member and a ring-shaped drain trough means positioned therebeneath, and one segment that is movable which comprises a pair of continuous, spaced-apart sidewalls having a plurality of spaced-apart, liquid permeable, process cells rotatably attached to the sidewalls. The sidewalls and their attached process cells are movable about a circular trackway for travel between the fixed hood and drain trough means, forming an annular process chamber therearound. The annular chamber is sealed by upper and lower, circumferential liquid seals coacting between the moving sidewalls and the stationary hood and drain trough means to prevent the leakage of solvent vapors therefrom. Feed means for introducing a slurry material to the cells along with solvent distribution means for continuously feeding solvent to the slurry filled cells are also provided. The cells are individually rotated 180° about their longitudinal axes in a discharge zone of the extractor to rapidly invert and dump the spent slurry into a discharge hopper for residual solvent recovery and disposal in a remote location. Cam track means and cam follower means are also provided to stabilize and to selectively rotate the cells in the discharge zone.

17 Claims, 9 Drawing Figures

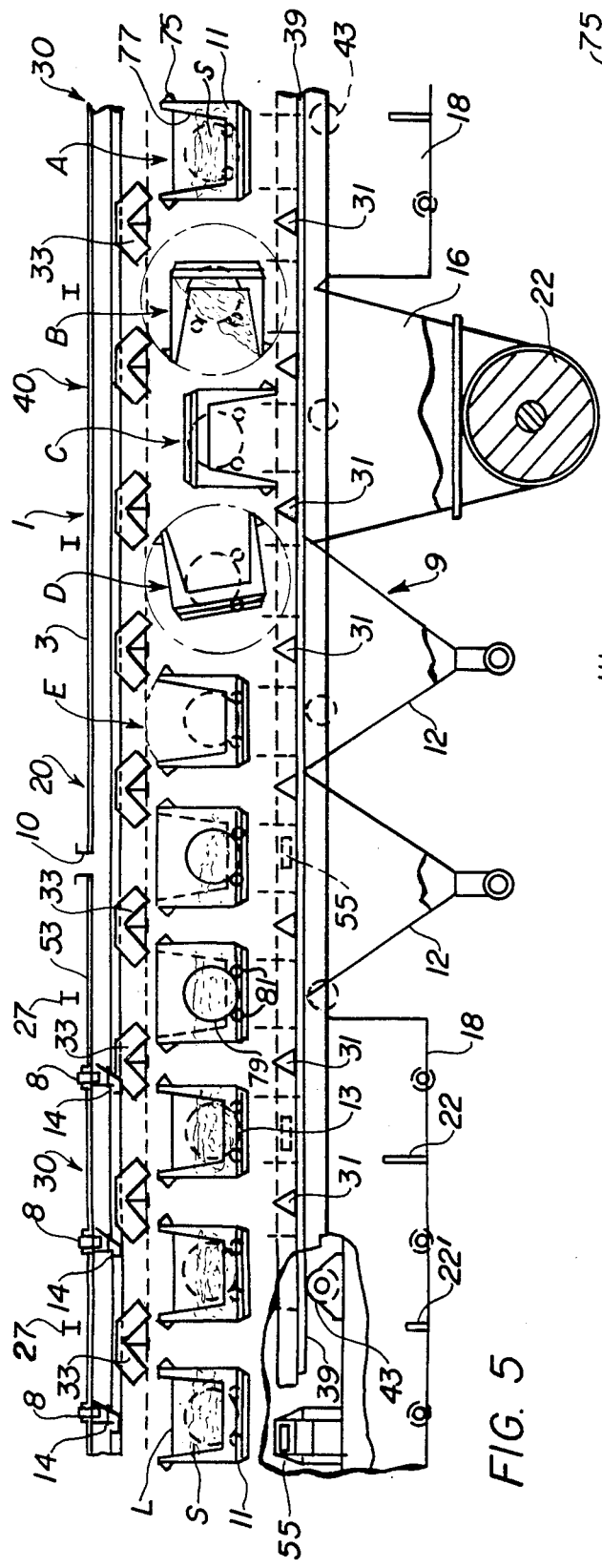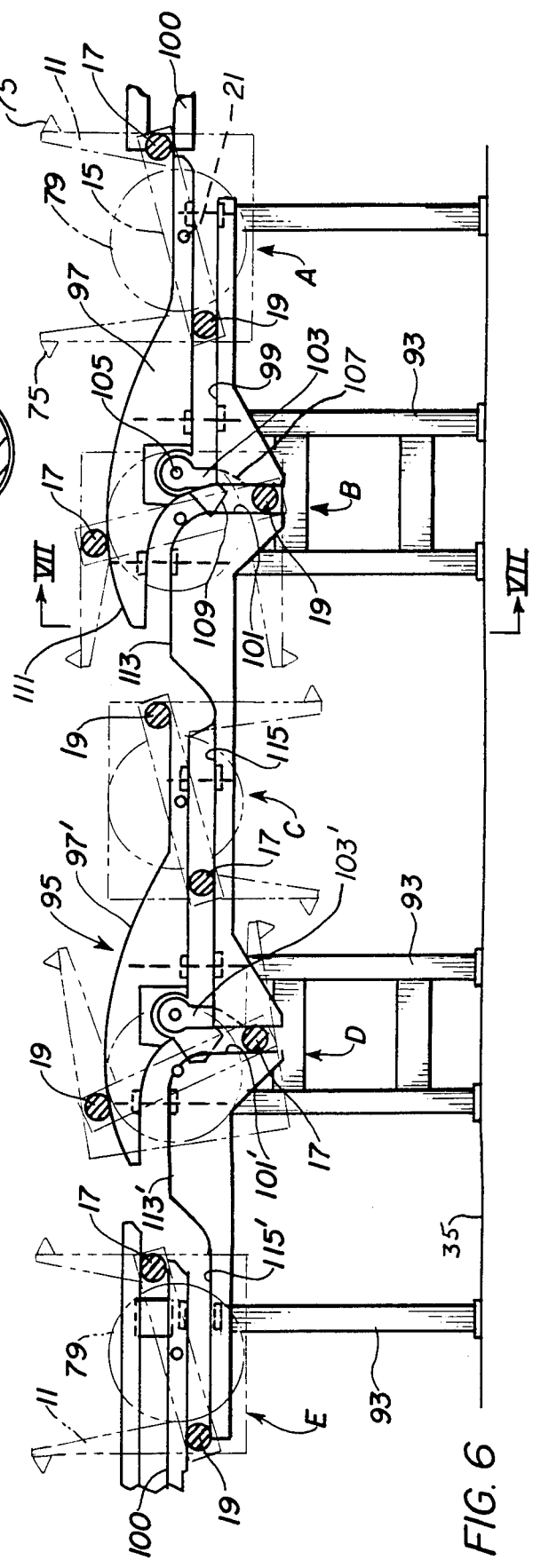
FIG. 5
FIG. 6

CIRCULAR SOLVENT EXTRACTOR

BACKGROUND OF THE INVENTION

The present invention relates generally to commercial apparatus for solvent extraction of oils and soluble materials from solids by use of volatile liquid hydrocarbon solvents. More particularly, our invention relates to apparatus in which high tonnages of extract-bearing solid material, such as tar sand, for example, may be processed in a continuous manner, wherein the material is moved substantially in a horizontal plane around a circular pathway as the solvent percolates through a slurry of the solid material while confined in individual treatment cells.

The art of solvent extraction for the recovery of bitumen from oil or tar sand is known, as exemplified by the apparatus and processes disclosed in U.S. Pat. Nos. 4,448,667; 4,422,901; and 4,221,764, which are owned by the assignee of the present application and which are incorporated herein by reference. It is thus, well known that oil or bitumen can be extracted from tar sands with a solvent, generally a volatile hydrocarbon or combinations of volatile hot hydrocarbons to provide a crude product for subsequent cracking in petroleum refineries. The solvent extraction of bitumen from tar sand is easily accomplished under laboratory conditions; however, realization of a commercial apparatus to date has not been achieved. Any apparatus, to be commercially feasible, must be capable of effectively removing the bitumen from many thousands of tons of sand per day to be economically profitable. In addition, such a large scale commercial apparatus must be safe and environmentally acceptable which is also difficult to realize when dealing with great volumes of volatile solvent materials.

It has been proposed, in the above-referenced patents, to provide a commercial solvent extraction system utilizing a chain of basket conveyors having parallel, endless chains arranged with upper and lower runs that extend in a generally horizontal direction. The chains carry a succession of spaced-apart process baskets with perforated bottoms extending crosswise between them. The baskets are pivotally connected with the chains at each end such that when the conveyor moves downwardly from the upper run to the lower run, the baskets remain upright. When the baskets travel upwardly from the lower run to the upper run, they are inverted to dump their contents and then restored to the upright position for loading with a slurry of tar sand and solvent to begin the horizontal, upper run. Trays are spaced beneath the upper and lower runs to collect and dispose of the solvent and extract that drains from the baskets. This prior extractor apparatus is unsatisfactory for high tonnage commercial plants because it would not be economically feasible to construct due to the size and height of the required structure. It would also be quite difficult and expensive to achieve proper sealing of the volatile solvents within such apparatus.

Solvent extraction in the production of vegetable oils from seeds, as for example soybeans, cottonseed, and the like, has been accomplished in apparatus disclosed in U.S. Pat. No. 2,840,459, which is also owned by the assignee of the present application. The rotary cell-type solvent extractor apparatus disclosed therein, having the trade name "Rotocel", performs effectively for small capacities on the order of two to three thousand tons per day of vegetable seeds. The device utilizes a bottom dump feature wherein the perforated bottom floor of each cell hinges downwardly to dump the vegetable seeds after processing. This prior apparatus has not found use in the solvent extraction of bitumen from tar sands because vegetable seeds and tar sands differ greatly in their respective physical properties. It is desirable in solvent treating tar sands, to utilize a fine mesh screen at the bottom of the treatment cells in order to keep the fines from entering the oil recovery system. Tar sand is a very abrasive material which may cause wear and premature failure of a relatively fragile, fine mesh screen if it were utilized in the bottom dump type of discharge present in the Rotocel device. The material must slide over the screened bottom of the cell during the discharge operation in that device. A commercial plant for tar sand processing, in order to be feasible, must be capable of efficiently, safely and economically processing on the order of fifty-thousand tons or more of sand every 24 hours, whereas a large oil seed plant process employing the Rotocel apparatus has a throughput of only about 3000 tons per day. The capacity of this known device is, thus, limited and not suited for tar sand. Ideally, in a commercial solvent extraction plant for the processing of tar sands, the apparatus should have a large throughput capacity and also be capable of utilizing potentially corrosive and volatile solvents and handling abrasive solids.

Our invention provides a circular solvent extractor apparatus which is suitable for use in a high-tonnage commercial plant for the treatment of tar sands. The circular solvent extractor of the present invention includes a plurality of individual batch-type cells which permits the recharging of solvent at discrete points along the machine while locating the key mechanical components such as wheels, bearings and drive components outside of the solvent vapor and abrasive particle environment of the process. The invention further provides a feed system for the slurry which will insure development of a homogeneous bed across the machine. Still further, our invention provides a rapid, 180° inversion dumping system which permits the use of fine mesh screens in the bottoms of the treatment cells. The fine mesh screens permit percolation of the solvent therethrough without contamination by solid fines. Since the cells are completely inverted in the discharge zone, abrasive wear of the fine screen material is minimized and the cell bottom life is extended. Our invention further provides a circular solvent extractor in which the process zone, containing streams of volatile liquid hydrocarbon solvents, is hermetically sealed from the atmosphere to prevent the escape of solvent vapors therefrom. Thus, our device represents a significant advance in improving the safety, environmental acceptability and economy of the process by greatly minimizing solvent vapor losses from the extractor apparatus. The solvent extractor of our invention is also thermally insulated so as to minimize the size of the solvent vapor emergency venting system. Still further, our invention provides a circular solvent extractor in which the inner and outer rotating sidewalls of the machine are structurally interconnected by spokes which also function as stream splitters between adjacent cells.

SUMMARY OF THE INVENTION

Our invention solves many of the problems encountered heretofore in apparatus suitable for use in the solvent extraction of oils and soluble materials from solids. Our invention provides a circular solvent extractor which is capable of processing high tonnages of solids on a continuous basis in a commercially economical, environmentally acceptable and safe manner. Briefly stated, the invention is directed to a circular solvent extractor for the continuous processing of solid materials such as tar or oil sands. The circular solvent extractor of the invention includes a continuous, ring-shaped stationary hood and a stationary ring-shaped trough means positioned beneath the hood. Track mounted, inner and outer, ring-shaped sidewalls are positioned between the hood and trough means to form a movable, annular chamber therebetween. A plurality of spaced-apart cells having perforated bottoms are rotatably supported by the sidewalls and travel around the circular pathway with the moving sidewalls. A cam track is positioned around the periphery of the apparatus which engages a pair of cam followers mounted on a rotator arm on each of the cells to cause each of the cells to invert and dump the processed slurry in a discharge zone of the apparatus. Upper and lower liquid sealing troughs are also provided between the stationary hood and collection trough means and the moving sidewalls to provide a hermetically sealed process area within the chamber defined by the sidewalls. The sidewalls and cells are moved around the circular trackway conventionally, such as by a pair of friction drive motors. The drive motors are externally mounted on the outside periphery of the sidewall so as to isolate these moving components from the corrosive solvent vapors and abrasive solids present within the annular chamber of the extractor. The inner and outer sidewalls are structurally interconnected at the top by a plurality of spaced-apart, inverted "V"-shaped members and a plurality of spaced-apart, bottom beam members. The upper transverse "V"-shaped members function not only as structural spokes coupling the two sidewalls, but also function as stream splitters to permit continuous feeding of solids or solvent to the cells as the individual moving cells pass beneath each of the stationary feeding points. The circular solvent extractor apparatus also includes a feed zone having a sealed feed means mounted through the statioary hood, transversely extending from the inner sidewall to the outer sidewall. A prepared slurry mixture of, for example, tar sand and solvent, is fed from a remote source to the feed means which directs the material into an empty cell which transversely extends between the inner and outer sidewalls. The filled cell then moves to the process zone of the extractor which comprises a plurality of spaced-apart solvent distribution manifolds which extend downwardly through the stationary hood and include transversely extending overflow weirs positioned at the discharge ends thereof. The weirs collect fines which may be entrained within the recycle solvent and prevents them from plugging the cells. The solvent or miscella or other liquids are fed through the distribution manifolds continuously to the moving cells and percolates through the solids bed in the cells to produce an extract or washes the contents of the cells after extraction has been completed. The stationary drain trough means beneath the moving cells continuously collects the percolated liquid and extract to recirculate or claim the bitumen product in a known manner. After processing of the beds, the cells enter a discharge zone of the circular solvent extractor apparatus whereupon the previously mentioned cam track causes each cell to individually rotate 180° and discharge its spent burden into a discharge hopper means. The discharge zone includes a take-away device such as a continuous screw conveyor or the like positioned beneath the discharge hopper means. The empty cell is then rotated an additional 180° by the cam track to an upright position and is, once again, loaded in the feed zone to begin the process anew.

The invention will hereinafter be described in connection with a process for the removal of a bitumen product from oil or tar sands; however, the invention is not necessarily restricted to such use or purpose.

BRIEF DESCRIPTION OF THE DRAWINGS

Our invention may be more fully understood by reference to the accompanying drawings, in which:

FIG. 5 is a fragmentary side elevational view of the extractor of the present invention depicting the discharge zone, the feed zone and portions of the process zone;

FIG. 6 is a partial side elevational view of the rotator cam track for guiding and rotating the process cells in the present invention;

DETAILED DESCRIPTION OF THE INVENTION

Figure 1:
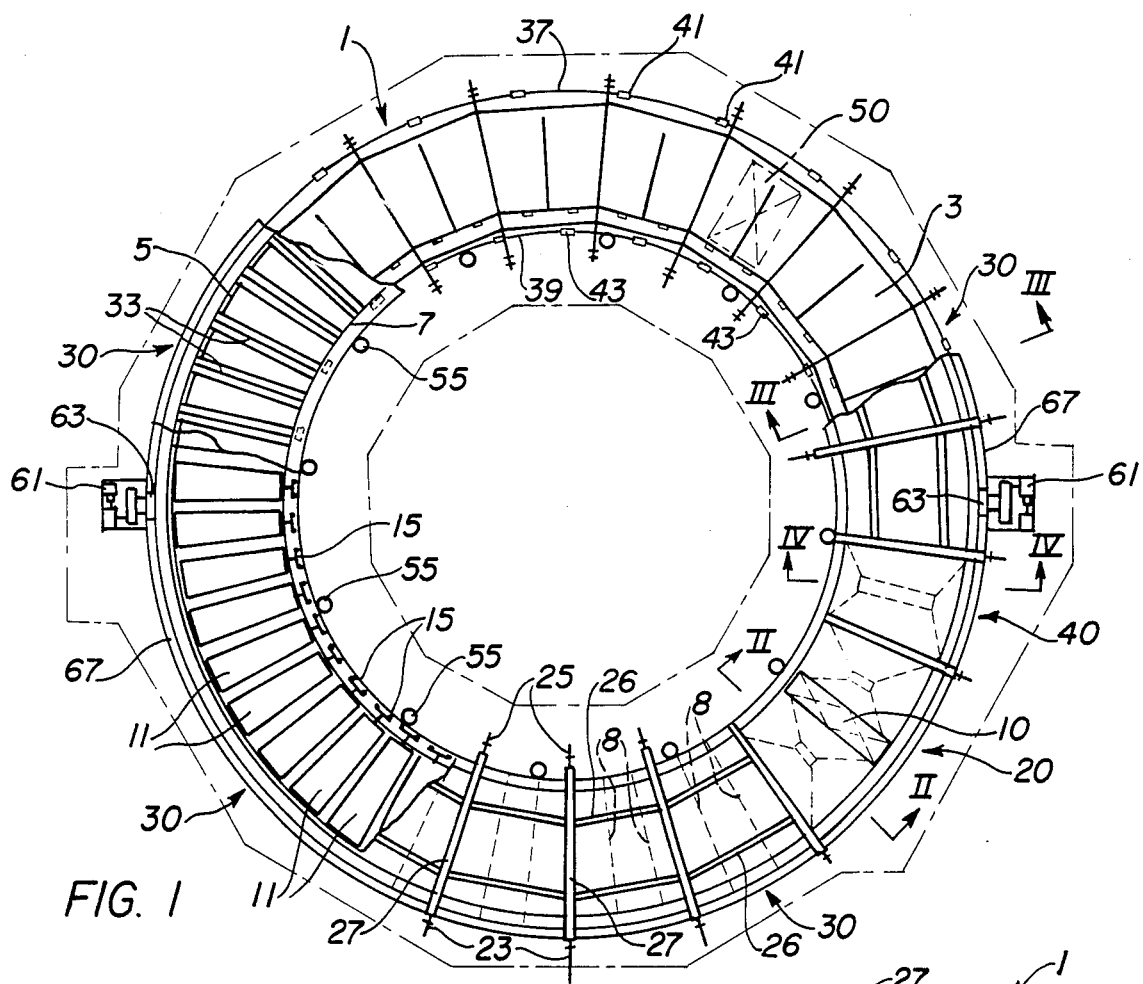
FIG. 1 is a fragmentary plan view of the circular solvent extractor apparatus, on a reduced scale.
Figure 2:
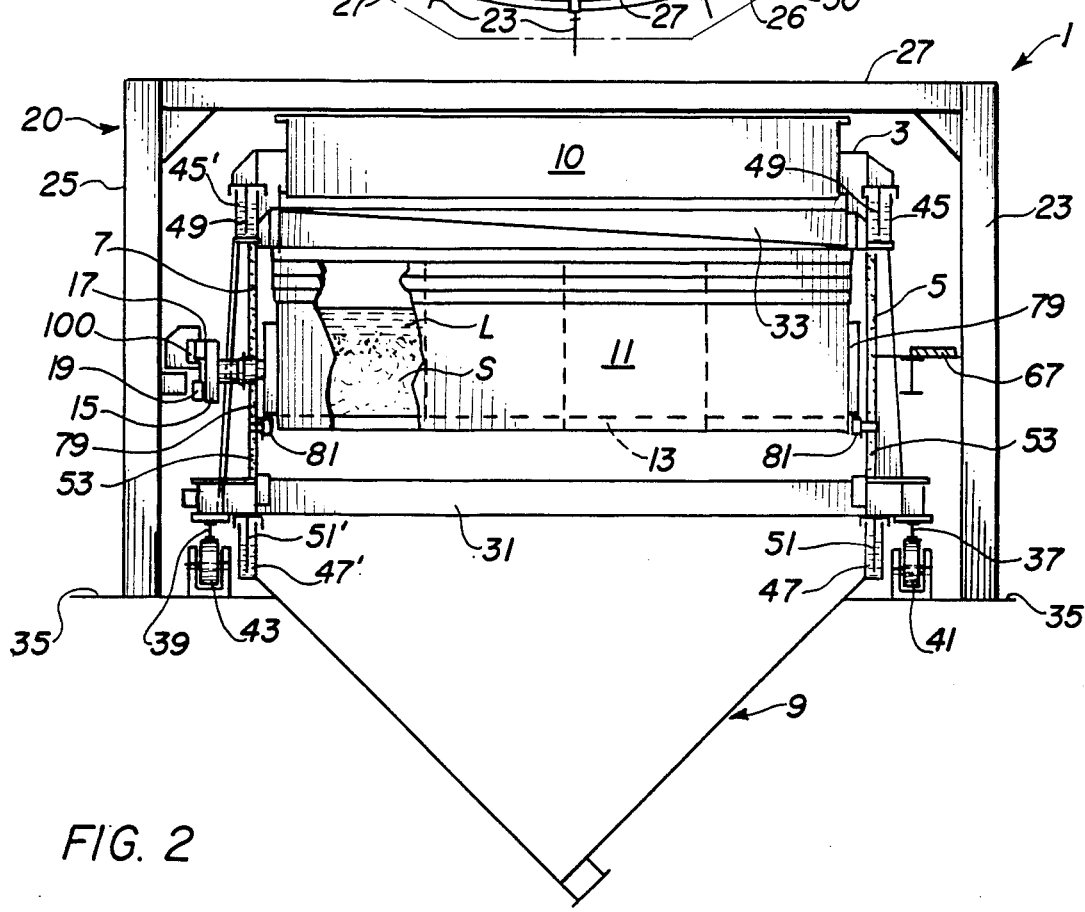
FIG. 2 is a transverse cross-sectional view of the feed zone taken along line II—II of FIG. 1.

Referring now to the drawings, the circular solvent extractor of the present invention, generally designated 1, is shown with portions cut-away for clarity in FIG. 1. The extractor apparatus includes a feed zone 20 for introducing the solid material to be treated, such as a slurry of tar sand and liquid hydrocarbon solvent to a plurality of moving process cells 11. The cells 11, after filling, move to a process zone 30 which occupies approximately 75% of the circumferential space around the circular solvent extractor 1. Following processing of the slurry bed by gravity percolation of solvent within the process zone 30, the cells 11 move to a discharge zone 40 where the individual cells are rotated and their solids contents dumped into a hopper with a screw conveyor located beneath to transport the spent material to a conventional solvent recovery unit. The details of construction concerning each of these zones will be described in greater detail hereinafter.

The circular solvent extractor 1 includes a ring-shaped, stationary hood 3 which forms an upper roof and a ring-shaped, stationary drain trough means 9 located beneath the hood 3. The stationary hood 3 is supported above the drain trough means 9 by way of a plurality of support arches or bents depicted in FIGS. 1-4. The support system for the hood 3 comprises a plurality of spaced-apart, beam-like bents each consisting of an outer upright column 23 and an inner upright column 25 interconnected at their tops by a transverse crossbeam 27. The crossbeams 27 are circumferentially interconnected by beams 26, FIG. 1. Hanger bracket members 29 are secured to the hood 3 and to the transverse crossbeam 27 as shown in FIG. 4. The lower ends of the upright columns 23 and 25 are securely anchored to a base surface 35 which may be at ground level or, preferably, is a structural steel plate above ground elevation to provide the necessary clearance to permit the placement of the large drain troughs 9 and other piping and equipment there beneath. An elevated base surface 35 is preferred so as to avoid the expense of extensive excavation.

Positioned beneath the stationary hood 3 is a continuous, ring-shaped outer sidewall 5 and a concentric, inner sidewall 7 which form an annular chamber between the hood 3 and the drain trough means 9. The sidewalls 5 and 7 are structurally interconnected by spaced-apart, transversely extending, lower beam members 31 and a plurality of spaced-apart, transversely extending, upper beam members 33. As perhaps best seen in FIG. 5, the upper transverse members 33 each have an inverted "V"-shaped upper surface which permits them to function not only as structural spokes interconnecting the sidewalls 5 and 7, but also presents an upper surface which functions as a stream splitter for slurry and liquid solvent being fed into the cells 11, which will be explained in greater detail herinafter.

The continuous outer sidewall 5 of the solvent extractor carries a ring-shaped rail 37 downwardly extending from its lower edge, while the inner sidewall 7 carries a similar ring-shaped, inner rail 39 which is concentric with the outer rail 37. A plurality of spaced-apart outer and inner wheel assemblies 41 and 43, respectively, are secured to the horizontal base surface 37, beneath the concentric rails 37 and 39 of the sidewalls. In this manner, the sidewalls 5 and 7, by virtue of the transverse members 31 and 33 and the wheel supported rail system, are structurally coupled together and are, thus, movable as a unit around the circular pathway beneath the stationary hood 3 and above the stationary drain trough means 9. While the above-described wheeled-track system is preferred, it is, of course, possible to reverse the elements and place the rails 37 and 39 on surface 35 and attach the wheel assemblies 41 and 43 to the sidewalls.

In order to contain the possibly toxic, corrosive and flammable solvent vapors within the confines of the chamber defined by the sidewalls 5 and 7 and the stationary roof 3 and drain trough means 9, so as to minimize the environmental and safety hazards, a pair of upper and lower continuous liquid seals 45 and 47 are provided. The upper, outer seal 45 and the inner, upper seal 45' are formed by continuous circumferential troughs formed at the top of the moving sidewalls 5 and 7, respectively. The troughs serve as containment means for a liquid such as water. The moving troughs 45 and 45' receive annular sealing plates 49 and 49' which are continuous with the outer and inner edges, respectively, of the stationary hood 3. In similar fashion, the lower ends of the sidewalls 5 and 7 each carry a continuous annular sealing plate 51 and 51', respectively, which travel while submerged in the liquid contained in a pair of stationary liquid troughs 47 and 47' carried at the upper edges of the stationary drain trough means 9. Thus, the annular sealing plates 49, 49' and 51, 51' extend beneath the surface of the liquid contained in the respective troughs 45, 45' and 47, 47', to establish an airtight or hermetic seal circumferentially around the chamber of the circular solvent extractor 1 to prevent the leakage of solvent vapors to the atmosphere and, to prevent the entry of atmospheric gases into the chamber.

Figure 3:
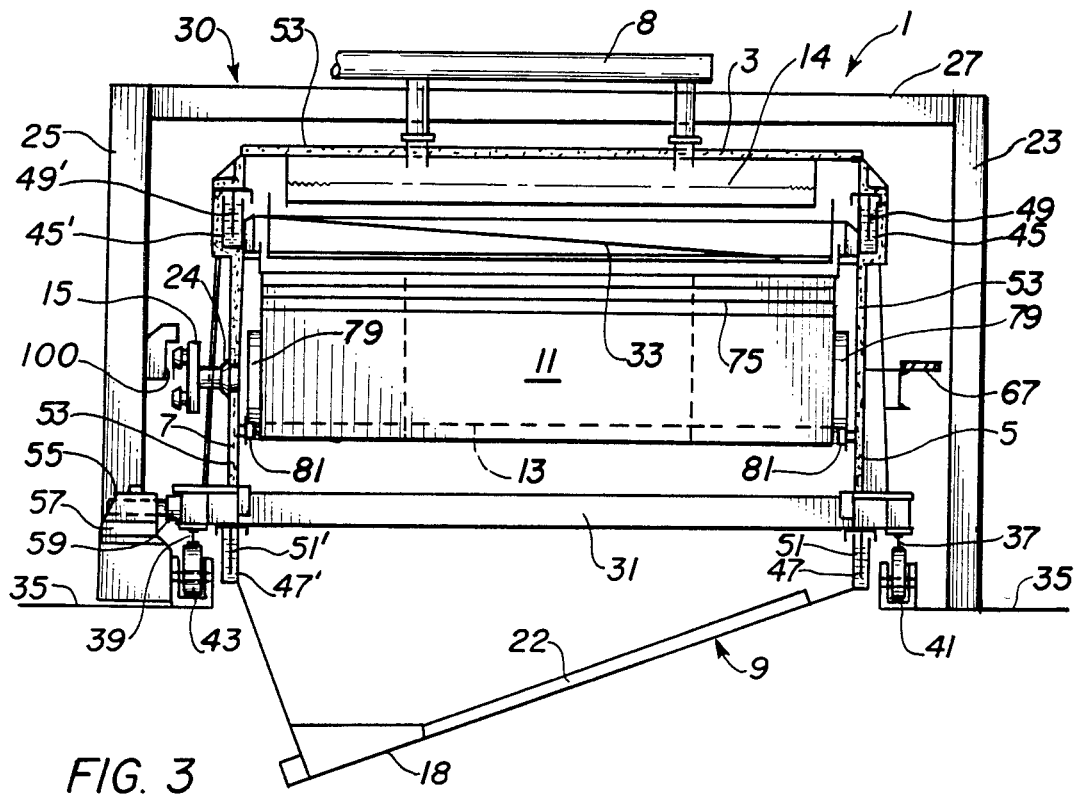
FIG. 3 is a cross-sectional view of the process zone taken along line III—III of FIG. 1.
Figure 4:
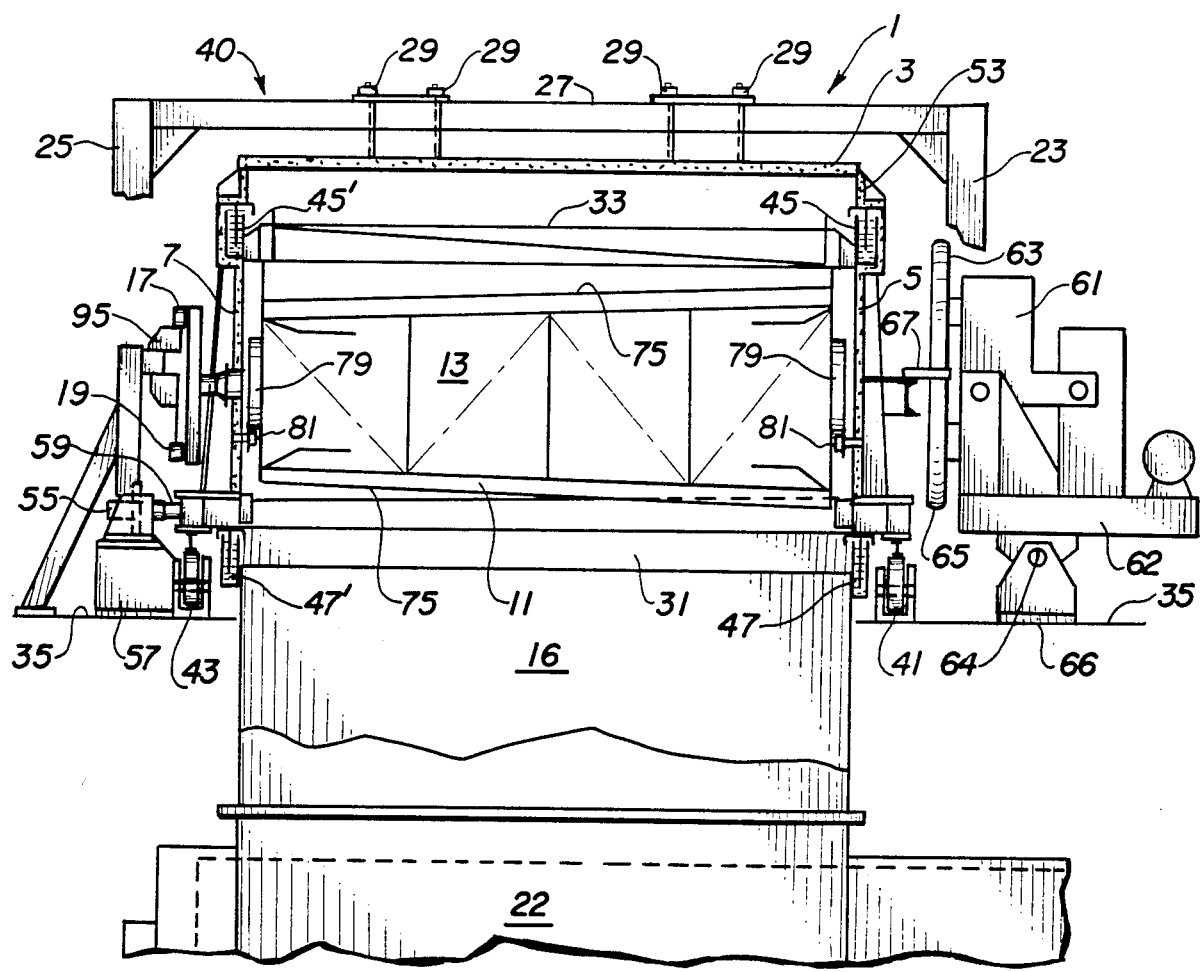
FIG. 4 is a cross-sectional view of the discharge zone taken along line IV—IV of FIG. 1.

In order to shield the interior of the solvent extractor from variations in temperature, the exterior surfaces of the sidewalls 5 and 7, as well as the hood 3, are covered with one or more layers of thermal insulation 53, such as fiberglass or the like, FIGS. 3 and 4. It is desirable to maintain the volatile solvent in its liquid phase, thus, rapid temperature excursions above the solvent's vapor point are to be avoided if possible. In the event of an external fire, the thermal insulation 53 would serve to maintain a cooler temperature within the interior of the extractor so as not to overload the emergency vapor venting system (not shown).

A plurality of guide wheels 55 are anchored to the horizontal base surface 35 in a spaced-apart array around the periphery of the inner sidewall 7 and rotatably situated within wheel housings 57. The guide wheels 55 rotate in a horizontal plane and engage a guide rail 59 which also extends in a horizontal plane around the exterior periphery of the inner sidewall 7. The guide wheels 55 bear against the rail 59 so as to maintain the circular concentricity of the inner sidewall 7 and the outer sidewall 5 as they travel around the trackway of the extractor 1. The concentricity afforded by the guide wheels 55 also insures proper alignment between the rails 37 with their respective wheels 41 and 43.

The sidewall structure is moved about the circular trackway of extractor 1 by a pair of conventional motorized friction drive units 61 which are positioned on diametrically opposed, outersides of the extractor, FIGS. 1 and 4. The outer sidewall 5 has a continuous, flat friction plate 67, lying in a horizontal plane and continuously extending around the circumference thereof. The friction plate 67 is tightly engaged by a rotating drive wheel 65 on its underside which is driven by the motorized drive unit 61 and grippingly engaged on the upperside by a rotatable pressure wheel 63 also carried by the drive unit 61. The plate-like wheels 63 and 65 rotate within a vertical plane which is perpendicular to the horizontal plane defined by the friction plate 67 and tightly engage the upper and lower surfaces, respectively, thereof. Due to the high pinch force applied to the plate 67 by wheels 63 and 65, a correspondingly high degree of frictional gripping is achieved. Thus, when the motorized friction drive units 61 rotate the lower drive wheels 65, the drive plate 67 is moved which then causes like movement of the sidewalls 5 and 7 about the wheeled trackways 41 and 43. Variations in the elevation of the friction drive plate 67 may occur due, in part, to the great physical size of the circular solvent extractor 1 which may be on the order of 100 feet or more in diameter. In order to accommodate such possible variations, each friction drive unit 61 is preferably mounted on a horizontal platform 62 which, in turn, is pivotally connected by a shaft 64 to a base member 66. The base member 66 is rigidly secured to the reference surface 35, FIG. 4. In the event that vertical dimensional variations should occur as the friction drive plate 67 moves between the wheels 63 and 65 of the drive unit 61, the base platform 62 is free to pivot upwardly or downwardly about the pivot shaft 64 to accommodate such variations. While the above-described friction drive unit 61 is presently preferred type of drive apparatus, other conventional drive means such as rack and gear motors or other known devices could also be employed.

Figure 8:
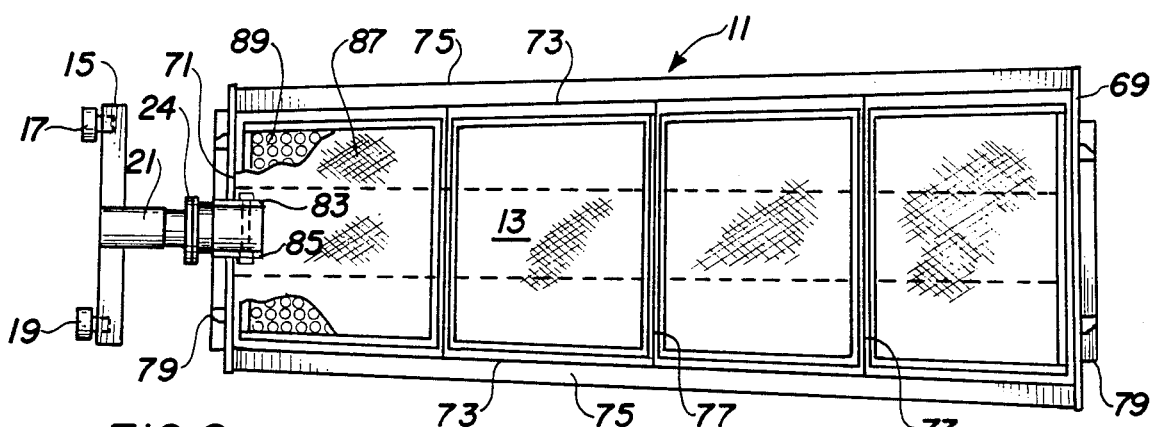
FIG. 8 is a plan view of a process cell showing the rotator arm and shaft assembly extending from one end thereof.

The process cells 11 are mounted for rotation about their longitudinal axes between the outer and inner sidewalls 5 and 7 of the extractor. As best seen in FIG. 8, the cells 11 are rectangular in plain view, in the shape of a symmetrical trapezoid, with the longer end 69 positioned adjacent the outer sidewall 5 and the narrower end 71 positioned adjacent the inner sidewall 7. The ends 69 and 71 are connected by elongated sides 73 which may each contain an outwardly extending, "V"-shaped longitudinal stiffener 75 along the upper edges thereof. The cells 11 also preferably include transverse stiffener webs 77 extending between the sides 73 so as to increase the strength of said cells. A circular wheel-ring 79 is affixed at each of the cell ends 69 and 71. Each wheel-ring is rotatably mounted on a pair of spaced-apart cell support rollers 81 which are secured to the respective sidewalls 5 and 7. As perhaps best seen in FIGS. 3 and 5, the sidewall mounted cell support rollers 81 rotatably engage the wheel-rings 79 to permit the cells 11 to rotate 360° about their longitudinal axes so as to effect a complete inversion of the cells during a dumping operation in the discharge zone 40.

In order to effect rotation of the cells 11 about their respective longitudinal axes in the discharge zone 40, each of the cells have a rotator arm assembly 15 affixed to the inner end 71 thereof. The rotator arm assembly 15 has a shaft 21 extending perpendicularly therefrom and axially aligned with the longitudinal axis of rotation of the cell 11. The ends of the rotator arm 15 carry rotatably mounted first and second rollers 17 and 19, respectively. As can perhaps best be seen in FIG. 6, the rotator arm 15 is affixed to the cell 11 at an inclined relationship relative to the bottom of the cell such that the cam roller 17 is slightly higher than the second roller 19 when the cell 11 is in the normal upright position. As shown in FIG. 8, the shaft 21 of the rotator arm 15 is fitted within a sleeve 83 which extends through the sidewall 71 of the cell. Shaft 21 is fixedly secured to the sleeve 83 by way of a tapered locking pin 85, or the like, which passes through the sleeve and the shaft 21. The shaft 21 also carries a flanged fitting 24 which includes a pair of rubber O-ring seals (not shown) to effectively seal-off any vapor seepage between the shaft 21 and the sleeve 83 which extends within the interior of the process cells 11.

Figure 9:
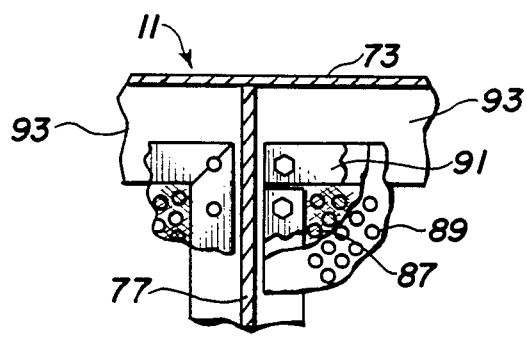
FIG. 9 is an enlarged, fragmentary plan view of a portion of the perforated bottom surface of the cell depicted in FIG. 8.

The cells 11 also have a perforated bottom 13 which includes an inner fine mesh screen 87 which may be, for example, a #14 mesh, type 304 stainless steel, corrosion resistant material which is backed-up on the outside of the cell by a heavy gauge, perforated plate 89 having a thickness on the order of ¼-½ inch and having large diameter holes of about ¼ inch in diameter staggered over its area, FIGS. 8-9. The fine mesh screen 87 and the back-up perforated plate 89 are held in place by marginal retainer bars 91 which are secured by way of appropriate fasteners to the bottom frame 93 of the cells, as depicted in the fragmentary view of FIG. 9. A fine mesh screen such as the screen 87 is particularly advantageous in the solvent extraction of bitumen from tar sands since it is beneficial to the economics of the system to prevent the sand fines from becoming entrained with the percolated solvent miscella as it exits the cells from the bottoms 13 thereof.

Figure 7:
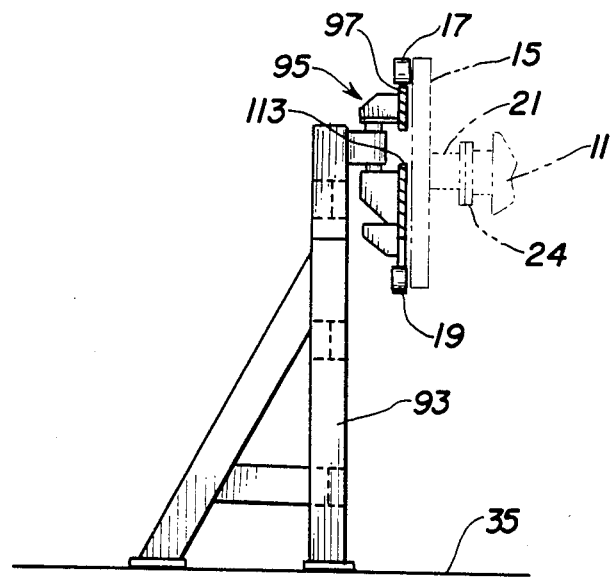
FIG. 7 is a cross-sectional front elevational view of the cam track taken along line VII—VII of FIG. 6.

While fine screens are thus desirable from the fines removal standpoint, it is also known that the oil or tar sand material is highly abrasive and causes excessive abrasive wear and damage to a fine mesh screen material if the tar sand is slidingly discharged from the cells in a trapdoor-type of dumping system. It is, therefore, desirable to achieve a rapid, fully inverted dumping action so as to prevent such abrasive wear from occurring on the fine mesh screens 87. In order to accomplish this desired rapid, fully inverted dumping action, a cam track, generally designated 95, is provided to guide the first and second cam rollers 17 and 19, respectively, and their attached rotator arm 15 through a 360° controlled dumping cycle. As depicted in FIGS. 6 and 7, the cam track 95 is rigidly mounted on a plurality of spaced-apart, vertical support members 93 which, in turn, are anchored to the base surface 35 of the extractor 1. Cam track 95 is positioned adjacent to the outer periphery of the inner sidewall 7 and includes a straight horizontally extending track section 100 which extends around the entire periphery of the extractor 1, except in the dumping zone 40 which is depicted in FIG. 6. The straight cam track 100 is engaged only by the first cam follower 17 to maintain the cells in an upright position so as to lend stability to the cells 11 as they are moved through the feed zone 20 and process zone 30.

As the cells move to the discharge zone 40, which appears at the right-hand side of FIG. 6, the second cam follower 19, which heretofore has been riding free from engagement with the cam track 95, enters a cam track area 99 while the first cam follower 17 begins its upward ascent along a cam surface 97. In FIGS. 5 and 6, the cells 11 are shown in five sequential positions designated "A"-"E", as they appear as they are rotated 360° through a dumping cycle within the discharge zone 40. From the upright position, designated "A", the cells 11 enter cam track 95 at the discharge zone and the first cam follower 17 begins an upward ascent along the cam surface 97 while the second follower 19 proceeds along the horizontal, cam surface 99, proceeding to a 90° downwardly sloping cam section 101. At this point, the turning arm assembly 15 rotates the cell 90° to the position "B". As the cells are traveling from right to left, the follower 19 will pass through a counterbalanced track switch 103 when the cell moves into position "B". The switch 103 is pivotally mounted about a shaft 105 which permits it to swing outwardly in a clockwise direction to permit the passage of follower 19 from cam surface 99 to the downwardly directed cam section 101. The track switch 103 further includes an elongated switch tongue 107 which engages the cam track 95 to prevent further movement of the tongue in a counterclockwise direction. Thus, when the second cam follower 19 moves past the switch 103, the tongue portion 107 pivots upwardly in a clockwise direction to permit the passage of the follower, whereupon, a counterweight portion 109 causes rotation of the switch tongue downwardly, in a counterclockwise direction, to a position where the tongue rests against the cam track 95 as shown in FIG. 6. In that position, the tongue 107 blocks rearward movement of the follower 19 to prevent it from reentering the cam track surface 99. At that point, with the cell continuously being moved by the attached, moving sidewalls, the second cam follower 19 begins to ascend the cam track section 101, while the first cam follower 17 begins to travel downwardly along cam track section 111, the switching tongue 103 blocks-off entry into the cam track section 99 so that follower 19 can only proceed upwardly to cam track section 113. At this stage, the cell 11 is in a fully inverted position, rotated 180° as depicted as position "C" in FIG. 6. In the inverted position, the second cam follower 19 assumes an orientation above the first follower 17. The segments of the cam track 95 extending from position "C" to position "D" are identical to those previously described between positions "A" and "B", including a track switch 103'. As was the case at position "B", at position "D" the follower 17 is momentarily detained in the downwardly directed cam track 101'. As the cell 11 is moved to the left, the cell is rotated in a counterclockwise direction which also causes the follower 19 to move downwardly toward the track section 115'. When the cam follower 19 begins to move downwardly, at position "D", the rotator arm 15 pivots about the axis of rotation of the arm shaft 21 which causes a corresponding upward movement of the cam follower 17 along the cam track section 101' to the horizontal track section 113'. At that point, the cell 11 moves to position "E" of FIG. 6 wherein the cell is once again in a fully upright position, having been rotated a full 360° from its entry into the discharge zone 40 at position "A". The emptied cells are then moved to the feeding zone 20 whereupon they receive a fresh charge of tar sand slurry material. For ease of comparison, the previously described cell positions "A" through "E" of FIG. 6 are also indicated at corresponding positions in FIG. 5.

While the cam track 95 has been described herein as one preferred means for rotating the cells 11 within zone 40, it will be appreciated that other means, such as a motorized rotator, could be employed in place thereof.

As the cells 11 travel with the sidewalls 5 and 7 from the discharge zone 40 to the feed zone 20, they pass beneath a solids feed conduit 10 which extends through the stationary hood or roof member 3. The slurry of tar sand and liquid solvent is continuously fed by the conduit 10 to the moving train of cells and is sealed from the atmosphere to prevent the escape of solvent vapors. The feed conduit 10 extends transversely across the chamber defined by the sidewalls 5 and 7 so as to deposit a uniform bed depth of slurry or solid material across the cells 11, FIG. 1 and 2. The slurry bed is indicated "S" and the liquid solvent level as "L" in FIG. 2.

As can be seen in FIG. 5, the upper transverse structural members 33 are fixed betweeen adjacent cells 11 to move with the cells and the sidewalls in constant, spaced relation to the open ends of the ajacent cells. In this manner, the transverse members 33, with their inverted "V"-shaped surfaces, act as stream splitters as they pass beneath the feed conduit 10 to divert the feed material and solvent into the adjacent cells rather than allowing the feed material to pass between the cells and thus reduce the process efficiency of the extractor. There will always be drainage of liquid material beneath the cells 11 in the feed zone and elsewhere due to the fact that the bottoms 13 of the cells are perforated. A pair of drain units 12 are provided beneath the feed zone 20 to collect such material and recirculate the collected fluids in a manner known in the art.

The freshly filled cells 11 exit the feed zone 20 and enter the process zone 30 whereupon they pass beneath a plurality of spaced-apart solvent distribution manifolds 8 which comprise a horizontal pipe section and vertically extending downcomers which pass through the hood 3 to deliver the solvent and/or miscella mixtures to an overflow weir 14 which is secured to the underside of the hood 3. Within the process zone 30, varying concentrations of solvent and/or miscella are continuously fed to the cells for gravity percolation through the slurry bed "S", in a known manner. The overflow weirs 14 are particularly suitable for distributing a recirculated tar sand miscella containing a concentration of fine particulate material, since the fines will be retained, to a large extent, by the overflow weirs 14. Such an arrangement serves to maintain the fine mesh screens 87 in the cell floors 13 in a generally unplugged condition. In addition, an overabundance of fine material within the bed of slurry being treated is undesirable, since they tend to plug the cell and prevent efficient percolation of the solvent therethrough.

Liquid solvent is continuously fed to the moving cells throughout the process zone by way of the manifolds 8 so as to maintain a head of liquid solvent "L" above the bed of slurry "S" within the individual cells. The solvent and miscella which drains from the bottoms 13 within the process zone 30 is continuously collected by drain troughs 18. The drain troughs 18 have a sloping floor with a plurality of spaced, transversely extending baffles 22 and 22' of varying heights, FIGS. 3 and 5. The baffles 22 and 22' segregate the various drain streams into particular segments throughout the process zone for further treatment or recycle in a known manner.

Thus, the cells 11 move through the process zone 30 around the circular pathway of the extractor 1 until they reach the discharge zone 40 whereupon the cam track 95 causes a rotation of the rotator arms 15 causing the treated spent slurry beds to be dumped from the cells and into a discharge hopper 16. Hopper 16 is positioned beneath the area where the cells 11 are in the rotated positions "B" and "C" of FIG. 5. At the bottom of hopper 16 is a screw conveyor mechanism 22 which continuously removes the treated slurry material from the hopper and delivers it to known treatment apparatus such as a stripper, or the like, wherein residual solvent may be recovered from the slurry for recycle.

It is, thus, understood that the solvent and slurry feeding and drain areas within and around the circular extractor 1 are completely sealed from the atmosphere which contributes to the safety, economy and environmental acceptability of the apparatus. The sealed construction confines the liquid and vapor phases of the solvent within the confines of the chamber defined by the hood 3, sidewalls 5 and 7, and the drain trough 9. In addition, the major moving mechanical components of the extractor are shielded from the potential corrosive effects of the solvent being employed in the extraction process. In this manner, the service life and maintenance expenses connected with the operation of the commercial solvent extractor are greatly enhanced. For ease of maintenance of the cells 11, a maintenance station 50 is provided as shown in FIG. 1. The station may be fitted with appropriate equipment such as cranes, hoist trucks and the like to permit the quick removal and replacement of worn or damaged cells.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circular solvent extractor apparatus suitable for processing a finely divided, abrasive feed stock material, such as tar sands and the like, said apparatus comprising:

circular trackway means;

continuous ring-shaped, inner and outer sidewalls positioned for travel on the circular trackway means, said inner and outer sidewalls having upper and lower edges and forming a continuous, annular chamber therebetween;

a plurality of spaced-apart structural spoke means extending between the inner and outer sidewalls to structurally interconnect the sidewalls for coupled travel;

motive means for moving the sidewalls about the circular trackway means;

stationary hood means positioned above the upper edges of the sidewalls;

a plurality of spaced-apart cells positioned within the annular chamber and each cell having a longitudinal axis extending along a radius of the circular solvent extractor apparatus, each cell having opposed inner and outer vertical end walls located adjacent the inner and outer sidewalls, respectively, vertical sides interconnecting the end walls and a liquid permeable bottom comprising a fine mesh screen element, said end walls, interconnecting vertical sides and bottom adapted to form a containment space for a bed of feed stock within each of said spaced-apart cells, and means for supporting the end walls of each cell onto a respective sidewall for coupled travel with the sidewalls;

stationery drain trough means positioned beneath the cells, sealing means circumferentially coacting between the stationary hood means and the upper edges of the sidewalls and between the stationary drain trough means and the lower edges of the sidewalls to substantially seal the annular chamber from ambient atmosphere;

feed means extending through the stationary hood means in a feeding zone of said extractor apparatus for introducing feed stock material to be treated into the cells to form a contained bed of feed stock material within each of said cells;

solvent distribution means extending through the stationary hood means in a process zone of said extractor apparatus for introducing a liquid solvent into the cells to permit the solvent to percolate downwardly through each of the contained beds of feed stock material and exit the permeable cell bottoms with an extracted product removed from said feed stock material; and said means for supporting the end walls of each of the cells includes means for rotating each cell about its longitudinal axis in a discharge zone of said extractor to invert the cells at least 180° and dump the treated beds of material therefrom and to return the dumped cells to an upright position prior to entry into said feeding zone.

2. The extractor apparatus of claim 1 wherein the structural spoke means includes an array of upper transverse spoke members having inverted "V"-shaped surface, each fixedly positioned above and between adjacent spaced-apart cells to structurally interconnect the upper edges of the sidewalls and to divert the feed material and liquid solvent from the open areas between adjacent cells into the adjacent cells when said upper spoke members pass beneath said feed means and solvent distribution means.

3. The extractor apparatus of claim 1 wherein the circular trackway means includes inner and outer concentric rails attached, respectively, to the lower edges of the inner and outer sidewalls and depending downwardly therefrom and further includes wheeled traveler means fixedly secured on a stationary base surface for supporting said concentric rails for travel thereon.

4. The extractor apparatus of claim 1 wherein the motive means for moving the sidewalls about the circular trackway means is operably coupled to one of said sidewalls and said structural spoke means transmits a driving moment from the driven sidewall to the other sidewall permitting said sidewalls to travel together.

5. The extractor apparatus of claim 4 wherein the motive means includes a flat ring-shaped friction drive plate outwardly projecting from the driven sidewall, extending continuously around the periphery thereof, at least one motorized friction drive means including a pair of drive wheels pinchably engaging said drive plate to move said driven and other sidewalls around the circular trackway means.

6. The extractor apparatus of claim 5 wherein the ring-shaped friction drive plate is affixed to the outer side wall and includes two motorized friction drive means operably coupled thereto.

7. The extractor apparatus of claim 4 wherein the motive means is operably coupled to the outer sidewall, said extractor apparatus further includes a horizontal, ring-shaped guide rail affixed to and continuously extending around an external surface of the inner sidewall, and a plurality of spaced-apart, fixed guide wheels positioned adjacent to the inner sidewall and engaging said guide rail to maintain concentricity of the sidewalls around the circular trackway means.

8. The extractor apparatus of claim 1 wherein each of said end walls carries a circular wheel ring, and said means for supporting each cell includes a plurality of spaced-apart pairs of support rollers outwardly extending from opposed sidewalls within the chamber to rotatably engage and support the wheel rings on opposed end walls of each of the cells to permit the coupled travel of each of the cells with the sidewalls.

9. The extractor apparatus of claim 8 wherein each of the cells includes a rotator shaft fixedly attached to the inner end wall and having an axis of rotation which is concurrent with the longitudinal axis of the cell, the means for rotating the cells comprises a cam track means fixedly secured adjacent to the inner sidewall in the discharge zone and rotator arm means attached to the rotator shaft of each of the cells for controlled travel along said cam track means, whereby said cam track means causes the rotation of said rotator arm and shaft in the discharge zone.

10. The extractor apparatus of claim 9 wherein the cam track means includes a generally horizontal portion extending adjacent to the feeding zone and the process zone to engage said rotator arm means of the rotator shaft to maintain the cells in a generally stabilized, upright position through said feed and process zones.

11. The extractor apparatus of claim 1 wherein substantially all of the exterior surfaces of the hood means and the sidewalls are covered by a layer of thermal insulation material.

12. The extractor apparatus of claim 11 wherein the thermal insulation material is a fiberglass material.

13. The extractor apparatus of claim 1 wherein the liquid permeable bottoms of the cells include a lower, load supporting perforated plate and an upper screen material lying on said perforated plate.

14. The extractor apparatus of claim 13 wherein the screen material is constructed of stainless steel wire and has a #14 standard mesh size.

15. The extractor apparatus of claim 1 wherein the sealing means includes upper and lower liquid sealing trough means positioned between the inner and outer sidewalls and the stationary hood means and the stationary drain trough means, whereby, a substantially hermetic seal between the annular chamber and the ambient atmosphere is obtained.

16. The extractor apparatus of claim 1 wherein the feed means includes a feed conduit means extending transversely across the annular chamber between the sidewalls to deposit a uniform bed of material across the cells.

17. The extractor apparatus of claim 1 wherein the discharge zone includes hopper means positioned beneath the cells to receive the dumped contents thereof and further including conveyor means for transporting the dumped contents from said hopper means.

* * * * *